United States Patent [19]

Armstrong et al.

[11] 4,233,396
[45] Nov. 11, 1980

[54] SHAPED POLYMERIC ARTICLES MADE BY TWO-STAGE PHOTOPOLYMERIZATION

[75] Inventors: Colin Armstrong, Woodley; Derek J. Walbridge, Beaconsfield, both of England

[73] Assignee: Imperial Chemical Industries Limited, London, England

[21] Appl. No.: 6,755

[22] Filed: Jan. 26, 1979

Related U.S. Application Data

[63] Continuation of Ser. No. 348,534, Apr. 6, 1973, abandoned.

[30] Foreign Application Priority Data

Apr. 10, 1972 [GB] United Kingdom ............... 16399/72

[51] Int. Cl.$^2$ .......................... G03C 5/00; H05B 1/00
[52] U.S. Cl. ....................................... 430/320; 264/22; 264/294; 264/296; 430/322; 430/325; 430/394

[58] Field of Search .................. 264/22, 294, 296; 96/35.1, 115 R, 115 P, 38.2; 430/320, 322, 325, 394

[56] References Cited

U.S. PATENT DOCUMENTS

| | | | |
|---|---|---|---|
| 2,705,836 | 4/1955 | Watson | 264/22 |
| 2,912,418 | 11/1959 | Johnson et al. | 264/294 |
| 3,681,786 | 8/1972 | Lynch | 264/22 X |
| 3,823,208 | 7/1974 | Asbelle et al. | 264/22 |
| 4,129,641 | 12/1978 | Ferrarini et al. | 264/294 |
| 4,175,177 | 11/1979 | Potts | 264/22 X |

*Primary Examiner*—Edward C. Kimlin
*Attorney, Agent, or Firm*—Cushman, Darby & Cushman

[57] ABSTRACT

A photocureable article which is of simple shape and is capable of being further shaped is formed by partially polymerizing a composition comprising photopolymerizable liquid in the presence of a photosensitive catalyst and then protecting the article from further irradiation. The article may be fibre-reinforced. The article may be subsequently shaped and further cured to produce a rigid article.

7 Claims, No Drawings

SHAPED POLYMERIC ARTICLES MADE BY TWO-STAGE PHOTOPOLYMERIZATION

This is a continuation of application Ser. No. 348,534 filed Apr. 6, 1973, now abandoned.

This invention relates to a polymeric article of simple shape which is capable of being further shaped and which may be cured to a rigid shaped article.

According to the present invention we provide a photocureable article which is of simple shape and is capable of being further shaped, which is formed by polymerising a composition comprising a photopolymerisable liquid in the presence of at least one photosensitive catalyst capable of initiating polymerisation of the photopolymerisable liquid on irradiation thereof, the composition being only partially cured to a non-fluid state and said article being then protected from further irradiation until it is subsequently further shaped and further cured to form a rigid article of more complex shape.

By a photopolymerisable liquid we mean a liquid comprising one or more materials at least one of which materials contains a photopolymrisable ethylenically unsaturated group. The liquid may be, for example, a mixture of the precursors of a cured polymer resin comprising at least one ethylenically unsaturated polymer and at least one ethylenically unsaturated monomer copolymerisable therewith. Such liquids are discussed in detail later in this specification. Alternatively, for example, the liquid may not comprise a monomer as such but may comprise a condensate which contains at least one photopolymerisable ethylenically unsaturated group and is prepared from intermediates which contain mutually reactive groups at least one of which intermediates contains an ethylenically unsaturated group. Suitable condensates include those prepared by reacting a hydroxyl group-containing liquid resin, for example a polyester resin containing free hydroxyl groups with a carboxyl group-containing ethylenically unsaturated monomer, for example methacrylic acid, methacrylol chloride and methacrylic anhydride; those prepared by reacting a carboxyl group-containing liquid resin with a hydroxyl group or glycidyl group-containing monomer, for example hydroxyethyl methacrylate and glycidyl methacrylate; those prepared by reacting a liquid epoxy resin with an acid or hydroxyl-containing ethylenically unsaturated monomer, for example methacrylic acid and its anhydride or hydroxy isopropyl methacrylate; those prepared by reacting a maleinised polybutadiene with a hydroxyl group or glycidyl group-containing monomer; those prepared by reacting a hydroxyl group-containing monomer with a methylol melamine or condensate thereof; and those prepared by reacting the condensate of a hydroxyl group-containing monomer with a diisocyanate.

The article of simple shape is produced by irradiating the composition comprising photopolymerisable liquid for a sufficient length of time to convert the composition from a free-flowing liquid state to a non-fluid state. On the other hand, the length of time for which the liquid is irradiated is carefully selected so that the article of simple shape is still capable of being further shaped, for example, by vacuum forming, extruding, moulding or merely by hand to produce an article having a more complex shape.

The article of more complex shape can then be rendered rigid by continuing the polymerisation process to completion. This is conveniently achieved by irradiating the moulded article. However, in certain cases the polymerisation process may be achieved, at least in part, by heating the moulded article.

Suitably the article of simple shape may be in the form of a sheet or film or the article may be a rod or tube.

The article of simple shape may be produced by effecting copolymerisation of the photopolymerisable liquid in a suitable mould or by extruding the partially polymerised mixture through a suitably profiled die. As the liquid requires to be irradiated it is necessary for the walls of the mould or extruder barrel to be transparent to the type of radiation, for example, visible or ultraviolet light, which is used to initiate polymerisation.

Also an article in the form of a film or sheet can be produced in a continuous manner by applying a layer of the liquid to a moving support surface, which may be the surface of a band or roller, and irradiating the liquid while it is on the temporary support surface until it is no longer fluid.

Nevertheless, in the most desirable form of the invention we arrange that selected areas of the liquid, for example, when applied as a layer on a temporary support surface or located within a mould are irradiated more than other areas so that those selected areas may be polymerised to an extent where they are rigid or alternatively to an extent where they are still capable of being further shaped. At the same time we arrange that the remaining areas of the liquid are only irradiated sufficiently to achieve a partial polymerisation so that these areas remain highly flexible in the article of simple shape. This is conveniently achieved by masking certain areas of the liquid by a material which is opaque to the radiation used, irradiating the remaining areas of the mixture until an advanced stage of polymerisation is reached in those areas. The mask is then removed and the liquid is irradiated overall for a short period so that partial polymerisation can occur in those areas which were previously masked by the opaque material.

A sheet produced in this way will have highly flexible regions and stiffer regions. This allows the sheet to be deformed, either manually, or mechanically, using the more flexible regions as 'hinge-lines', so that the sheet adopts a non-planar form.

It will, of course, be realised that if the final polymerisation process is achieved by irradiating the article with an appropriate source of radiation, then it will be necessary to prevent the article of simple shape from being irradiated to the extent that the polymerisation proceeds to a stage at which the article is not capable of being further shaped. Conveniently, when the final polymerisation occurs when the article is exposed to ultra violet or visible light then this may be prevented from occurring prematurely by storing the articles of simple shape in suitable opaque bags.

On the other hand, if the final polymerisation is achieved by heating the article after it has been provided with its final shape, then it will be necessary to ensure that the article of simple shape is not heated to the temperature at which further polymerisation occurs. Conveniently this is achieved by storing the article in a refrigerated container until required.

The present invention can be used to advantage in the preparation of moulded articles in general. Firstly the polymerisable liquid including the photosensitive catalyst is poured into a suitable mould, the liquid is then irradiated until a partially polymerised self-supporting moulded article is formed. Secondly the moulded article is removed from the mould and finally cured externally of the mould by further irradiation or by heating. This has the advantage that the mould is made available for a further moulding operation more quickly than otherwise would be the case.

Generally speaking, however, the present invention will be more useful in its wider context of providing a flexible article of simple shape which can be stored for long periods without deterioration of properties and which can be further shaped to produce an article of more complex shape. The further shaping of the article may be effected, for example, by vacuum forming, compression moulding, or, where the article is sufficiently flexible, by draping the article as a sheet over a mould. The article, once it has been provided with its final shape, is cured by exposing the article to a suitable radiation which may be visible light, ultra violet light or an electron beam. The radiation actuates the photosensitive catalyst which initiates copolymerisation of e.g. the ethylenically unsaturated polymer and the ethylenically unsaturated monomer, the said polymer and monomer copolymerising to produce a rigid article. Alternatively, the final curing may be effected at least in part by heating the article.

Where the shaped article is further shaped and is not capable of retaining its shape unaided after further shaping, it must be constrained into the desired shape. Clearly, it must also be possible when the article is so constrained and when the final curing is effected by irradiating the article, for the radiation to strike the surface of the article. This can either be achieved using a mould which is transparent to the radiation or by using a moulding technique such as vacuum forming which leaves a surface of the moulded article exposed.

Desirable products according to the invention are produced by polymerising a mixture of the precursors of a cured polyester resin comprising at least one ethylenically unsaturated polyester and at least one ethylenically unsaturated monomer copolymerisable therewith in the presence of the photosensitive catalyst.

The ethylenically unsaturated polyester component of the cured polyester resin precursors may be derived, for example, by esterification of an unsaturated dicarboxylic acid or mixture of such acids with a saturated diol or mixture of such diols, or by esterification of a saturated dicarboxylic acid or mixture of such acids with an unsaturated diol or mixture of such diols. If desired one or more unsaturated acid or acids may be used together with or in place of the saturated acid or acids, and one or more unsaturated diol or diols may be used together with or in place of the saturated diol or diols. Where possible, an anhydride may be used in place of the corresponding dicarboxylic acid. One or more carboxylic acids of functionality greater than two may be used together with or in place of one or more of the dicarboxylic acids. Similarly, one or more polyols of functionality greater than two may be used together with or in place of the diols.

Examples of suitable ethylenically unsaturated polyesters include, for example, those formed by esterification of maleic acid or anhydride, fumaric acid, or itaconic acid or mixtures thereof with, for example, ethylene glycol, propylene glycol, butane—1:4-diol, pentane—1:5-diol, cyclohexane—1:4 diol, glycerol, trimethylol propane or neopentyl glycol or mixtures thereof. Suitable saturated acids which may also be incorporated into the above described ethylenically unsaturated polyesters include, for example phthalic acid or anhydride, isophthalic acid, terephthalic acid, adipic acid, sebacic acid, glutaric acid or pimelic acid or mixtures thereof. Examples of suitable ethylenically unsaturated polyesters which may be mentioned in particular include a condensate of isophthalic acid and fumaric acid with propylene glycol, a condensate of phthalic acid or anhydride and fumaric acid with propylene glycol, cyclohexane—1:4-diol or neopentyl glycol, and a condensate of propylene glycol with either fumaric acid or a mixture of phthalic acid or anhydride and maleic acid or anhydride.

Examples of suitable ethylenically unsaturated monomers which are copolymerisable with the ethylenically unsaturated polyester component are vinyl monomers including, for example, vinyl esters, aromatic vinyl compounds and vinyl nitriles. Suitable vinyl esters include, for example, vinyl acetate and esters of acrylic acid having the formula $CH_2=CH—COOR$, where R is an alkyl, aryl, alkaryl, aralkyl or cycloalkyl group. For example, R may be an alkyl group having from 1 to 20, preferably 1 to 10 carbon atoms.

Other suitable vinyl esters include, for example, esters of formula $CH_2=C(R')$ COOR where R' may be an alkyl, aryl, alkaryl, aralkyl or cycloalkyl group. In the ester of formula $CH_2=C(R')$ COOR, R and R' may be the same or different.

Particular vinyl esters which may be mentioned include methyl acrylate, ethyl acrylate, methyl methacrylate, ethyl methacrylate, n- and iso-propyl acrylates, n- and iso-propyl acrylates, n- and iso-propyl methacrylate, and n-, iso- and tertiary-butyl acrylates, and n-, iso- and tertiary-butyl methacrylate. Hydroxy ethyl methacrylate, vinyl pyrolidone, acrylamide, methacrylamide, dimethyl amino ethyl methacrylate, 2-vinyl pyridine, polyethylene glycol mono- and dimethacrylate, methacrylic and acrylic acid.

Aromatic vinyl compounds which may be mentioned include, for example, styrene and derivatives thereof, e.g. α-alkyl derivatives of styrene, e.g. α-methyl styrene, and vinyl toluene.

Suitable vinyl nitriles include, for example, acrylonitrile and derivatives thereof, e.g. methacrylonitrile polyfunctional vinyl monomers, that is, monomers containing two or more vinyl groups are also suitable. Suitable monomers include, for example, glycol dimethacrylate, divinyl benzene and diallyl phthalate.

The proportion of vinyl monomer or monomers to ethylenically unsaturated polyester in the cured polyester resin precursors is preferably in the range 20% to 90% by weight of at least one ethylenically unsaturated polyester to 80% to 10% by weight of at least one vinyl monomer. More preferably the said precursors comprise from 40% to 85% by weight of at least one ethylenically unsaturated polyester and from 60% to 15% by weight of at least one vinyl monomer.

The shaped article of our invention may also include fibrous reinforcement in order that the properties of the fully cured article produced by completing copolymerisation of eg ethylenically unsaturated polymer and the ethylenically unsaturated monomer may have improved properties, for example, improved impact strength and flexural properties. Suitable fibrous reinforcements include glass, e.g. in the form of mat or chopped rovings, or continuous flock, asbestos, carbon or fibres of an organic polymer, e.g. of nylon or poly (ethylene terephthalate). The fibrous reinforcement may be present in a proportion of, for example, 5% to 60% or even 70% by weight of the fibre reinforced shaped article and may be incorporated into the article by methods known in the art of reinforced resin technology.

The shaped article of our invention may also contain pigments, antioxidants, antiozonants, fillers such as calcium carbonate chemical blowing agents and ultra violet stabilisers.

It should, of course, be realised that a particular pigment, filler or other additive may reduce the effectiveness of certain photosensitive catalysts which are rendered effective by visible or ultra violet light. Generally speaking, however, for a certain pigmented system, a suitable catalyst can be selected from the range of photosensitive catalysts available.

Examples of photosensitive catalysts which can be used to initiate copolymerisation of the ethylenically unsaturated polymer and the ethylenically unsaturated monomer include: an aliphatic or aromatic diketone and a reducing agent, e.g. benzil and dimethyl benzylamine; a vicinal polyketaldonyl compound e.g. diacetyl benzil; $\alpha$-carbonyl alcohols e.g. benzoin; acyloin ethers e.g. benzoin methyl ether; $\alpha$-hydrocarbosubstituted acyloins e.g. $\alpha$-methyl benzoin; polynuclear quinones e.g. 9,10-antraquinone, 1, chloroanthraquinone; alkyl disulphides e.g. di-n-butyl disulphide; aralkyl disulphides e.g. dibenzyl disulphide; aryl disulphides e.g. diphenyl disulphides; aroyl disulphides e.g. dibenzoyl disulphides; acyl disulphides e.g. diacetyl disulphide; cycloalkyl disulphides e.g. dibornyl disulphide; mercaptans, 2-mercaptobenzothiazole; thiols e.g. thiophenol; dithiocarbamates e.g. N,N' dimethyl dithiocarbamate; thioketones; O-alkyl xanthene esters e.g. carbethoxy methylene bis ethyl xanthate; thicram derivatives e.g. tetramethyl thiuram disulphide; diphenylene ketones e.g. fluorenone, with a tertiary amine; peroxides e.g. benzoyl peroxide; hydroperoxides (cumene hydroperoxide); azonitriles e.g. 2-azo-bisisobutyronitrile; halogen compounds such as $\alpha$-haloketones, chloro-bromo, and iodo-acetic acids and sulphonyl chlorides; dyes/reducing agent; or a combination of any of the above such as a benzoin derivative and a peroxide.

The invention will now be described with reference to the following Examples in which all parts are by weight.

EXAMPLE 1

A mixture was formed from 70 parts of an unsaturated polyester based on maleic anhydride phthalic anhydride and propylene glycol and 30 parts of styrene. To the liquid mixture was added 0.2 parts of benzil and 3.0 parts of dimethyl benzylamine.

The mixture was temporarily stored in the dark until required.

The mixture was used to impregnate a glass-fibre matting in a mould which consisted of two parallel transparent glass plates each of which was lined with a transparent sheet of polyethylene terephthalate. The glass plates were separated a distance of 0.2 inch by suitable spacers. The fibre matting was inserted in the mould which was then filled with the mixture.

The filled mould was placed under four 20 watt Atlas Blue fluorescent tubes and irradiated for 5.5 mins. A flexible glass reinforced polyester sheet was produced which was capable of being moulded by the usual sheet moulding techniques and by hand. Furthermore, the sheet could be stored in the dark without any loss of flexibility.

After moulding, the moulded sheet could be rendered rigid either by irradiating it as above for thirty minutes or by exposing the moulded sheet to daylight (winter) for about 1-5 hours.

EXAMPLE 2

The procedure as outlined in Example 1 was repeated except that certain portions of the impregnated glass fibre matting were irradiated for a different length of time than other portions of the impregnated glass fibre matting. This was achieved by covering the mould, before it was irradiated, with a lattice formed from an opaque material such as black polyethylene sheet.

The mould was irradiated in the same manner as in Example 1 for 25 minutes. The lattice was removed and the mould was irradiated for a further 4 minutes.

The glass reinforced polyester sheet so formed was removed from the mould. On inspection it was found to have rigid areas corresponding to those areas which had been irradiated continuously and interconnected flexible areas corresponding to those areas which were concealed by the opaque lattice.

The sheet was capable of being deformed in those areas which were flexible and could be moulded by the usual sheet moulding techniques and by hand.

After moulding, the moulded sheet could be rendered rigid overall either by irradiating it under four 20 watt Atlas Blue tubes for about thirty minutes or by exposing the sheet to daylight (winter) for about 1.5 hours.

EXAMPLE 3

A mixture was formed from 99.5 parts by weight of a polyester (sold by Scott Bader under the Trade Mark CRYSTIC 189) and 0.5 parts by weight of Benzoin. The mixture was used to impregnate a glass fibre matting in a mould as described in Example 1.

The filled mould was then placed under a Philips HPR mercury lamp for 6.5 minutes to give a flexible glass reinforced polyester sheet which was still capable of being further shaped by the usual sheet moulding techniques and by hand. The sheet could also be stored in the dark for long periods without any loss of flexibility.

Eventually the flexible sheet was moulded to some other shape. After moulding, the moulded sheet was rendered rigid by irradiation under the same lamp for 35 minutes.

EXAMPLE 4

The procedure as outlined in Example 2 was repeated except that the mixture described in Example 3 was used.

The 'masked' mould was irradiated for 28.5 minutes.

After removing the lattice mask the mould was irradiated for a further 6½ minutes.

The glass reinforced polyester sheet so formed was removed from the mould. This was similar in all respects to the product described in Example 2 and could be further shaped as explained in Example 2.

Though the above Examples have been concerned with cured polymeric resins based on an unsaturated polyester and styrene, the invention can equally well be carried out with other curable polymeric resins based on an ethylenically unsaturated polymer and an ethylenically unsaturated monomer which is copolymerisable therewith. Examples of other curable polymeric resins are vinyl urethane resins, polyesters with acrylic ester terminal groups, epoxy acrylates and solutions of polybutadiene resins in styrene or vinyl toluene.

The articles of simple shape described herein can be used to advantage for a variety of purposes, for example, in the production of large mouldings such as ships hulls, car bodies, caravan panelling; as a surgical bandage; in the production of articles for packaging. The articles described herein may also be provided with a decorative or surface coating of a suitable coating composition.

They may also be laminated to a suitable plastics sheet material which may be pigmented, printed and/or embossed, the plastics sheet material serving to enhance the decorative or functional surface properties of the article.

EXAMPLE 5

A photocureable liquid polymer was prepared as follows: A mixture of 5 moles of adipic acid and then moles of phthalic anhydride was condensed with 16.5 moles of ethylene glycol to give a saturated polyester with an acid value of 25 mg KOH/g. This polyester was then esterified using an excess of methacrylic acid and the resulting resin dissolved in an equal weight of acetone. The solution was stirred in the presence of sodium carbonate before filtering and removing the acetone under reduced pressure. To the remaining liquid resin 0.2% benzil and 4.0% dimethyl amino ethyl methacrylate (based on the weight of resin) were added as the photo-sensitive catalyst.

The above mixture was used to impregnate a glass fibre matting in a mould as described in Example 1. The filled mould was then placed under four Atlas Blue 20 watt tubes emitting light in the region 325-600 nanometers (nm) and peaking at 430 nm. and irradiated for four minutes. A flexible sheet was produced which could be removed from the mould and moulded by the usual sheet mounding techniques or by hand. This sheet was capable being stoved by sealing it in aluminium foil. No loss of flexibility occurred on storage.

A piece of the above sheet was cut off and placed around a 1" diameter rod and then irradiated for 30' under the four 20 watt Atlas Blue tubes to rigidise it.

EXAMPLE 6

The procedure as outlined in Example 2 was repeated except that the mixture described in Example 5 was used. The masked mould was irradiated for 30 minutes and after removing the lattice mask the mould was irradiated for a further 4 minutes.

The glass-reinforced polyester methacrylate sheet so formed was removed from the mould. This was similar to the product described in Example 2 and could be similarly shaped.

What we claim is:

1. A process of producing a rigid article which comprises the steps
    (a) partially polymerizing by irradiation with visible or ultraviolet light a composition of fibrous reinforcement and a photopolymerizable liquid which comprises an ethylenically unsaturated polyester and an ethylenically unsaturated monomer in the presence of at least one photosensitive catalyst capable of initiating polymerization of the liquid on irradiation so as to form a flexible sheet, film, rod or tube said sheet, film, rod or tube being further polymerizable on exposure to visible or ultraviolet light but not polymerizable further if stored in the dark,
    (b) halting the polymerization by temporarily protecting the sheet, film, rod or tube from further irradiation whereby the sheet, film, rod or tube may be stored for a long period without deterioration of properties, and
    (c) subsequently shaping and further irradiating the sheet, film, rod or tube to polymerize it to form a substantially rigid article of more complex shape.

2. A process according to claim 1 wherein the polyester is derived by the esterification of an unsaturated dicarboxylic acid, or a mixture of such acids, with a saturated diol, or a mixture of such diols, or by the esterification of a saturated dicarboxylic acid, or a mixture of such acids, with an unsaturated diol or mixture of such diols.

3. A process according to claim 1 wherein the polyester is derived by the esterification of an unsaturated dicarboxylic acid, a saturated dicarboxylic acid and a saturated diol.

4. A process according to claim 1 wherein the polyester resin comprises 20-90% by weight of at least one ethylenically unsaturated polyester and 80-10% by weight of at least one ethylenically unsaturated monomer.

5. A process according to claim 1 wherein the photosensitive catalyst is a teritary amine in combination with an aromatic diketone or with diphenylene ketone.

6. A process according to claim 1 wherein the catalyst is a tertiary amine in combination with benzil or fluorenone.

7. A process according to claim 1 including incorporating fibrous reinforcement into said article.

* * * * *